(12) United States Patent
Binot et al.

(10) Patent No.: US 7,678,278 B2
(45) Date of Patent: Mar. 16, 2010

(54) METHOD OF TREATING WATER WITH AN INORGANIC POWDER REAGENT

(75) Inventors: Patrick Binot, Rentilly par Bussy St. Georges (FR); Abdelkader Gaid, Paris (FR); Pascal Roche, Maison-Laffitte Cedex (FR)

(73) Assignee: OTV S.A. SA, Saint-Maurice Cedex (FR)

( * ) Notice: Subject to any disclaimer, the term of this patent is extended or adjusted under 35 U.S.C. 154(b) by 624 days.

(21) Appl. No.: 11/536,771

(22) Filed: Sep. 29, 2006

(65) Prior Publication Data
US 2008/0078721 A1 Apr. 3, 2008

(51) Int. Cl.
*C02F 1/28* (2006.01)
*C02F 1/32* (2006.01)
*C02F 1/76* (2006.01)

(52) U.S. Cl. .................. 210/661; 210/665; 210/669; 210/694; 210/748; 210/754

(58) Field of Classification Search .................. 210/661, 210/669, 694, 748, 663, 665, 666, 667, 754
See application file for complete search history.

(56) References Cited

U.S. PATENT DOCUMENTS

| | | | |
|---|---|---|---|
| 3,994,804 A * | 11/1976 | Kalvinskas et al. | ......... 210/669 |
| 5,364,534 A | 11/1994 | Anselme et al. | |
| 5,932,099 A | 8/1999 | Cote et al. | |
| 7,157,001 B2 * | 1/2007 | Christeson | .................. 210/617 |
| 7,172,701 B2 * | 2/2007 | Gaid et al. | .................... 210/616 |
| 2005/0103719 A1 * | 5/2005 | Binot et al. | .................. 210/723 |

FOREIGN PATENT DOCUMENTS

WO WO 2004/048277 A1 * 6/2004

* cited by examiner

*Primary Examiner*—Matthew O Savage
(74) *Attorney, Agent, or Firm*—Coats & Bennett, P.L.L.C.

(57) ABSTRACT

A process for treating water is provided where the water is mixed with an inorganic reagent powder such as powder activated carbon. Organics and micropollutants are absorbed by the reagent powder. After the reagent powder has been mixed with the water, the water is directed to a setting tank and sludge from the water settles to produce a clarified effluent. Forming a part of the sludge is the reagent powder previously added. Sludge is collected and directed to a separator that separates the reagent powder from the sludge. Separated reagent powder is recycled and mixed with the water being treated.

12 Claims, 2 Drawing Sheets

METHOD OF TREATING WATER WITH AN INORGANIC POWDER REAGENT

SUMMARY OF THE INVENTION

The present invention entails a method of treating water where an inorganic powder reagent is added to the water to remove contaminants or pollutants of interest such as organics (total organic carbon) and micropollutants. A clarifier or settling zone is provided where sludge in the water settles, and wherein the sludge includes the powder reagent. The process entails directing the sludge to a separator and separating the powder reagent from the sludge and recycling the separated powder reagent for use in treating the water.

The present invention also entails a process for pre-treating water prior to the water being chlorinated. This pre-treatment process entails mixing an inorganic powder reagent, such as powdered activated carbon, to the water prior to chlorination. The inorganic powder reagent absorbs organics and micropollutants that, if left in the water, give rise to what is termed "disinfection byproducts."

In another embodiment of the present invention, a process is disclosed for treating water where the water is first clarified, and after being clarified, is directed to one or more treatment zones where an inorganic reagent powder or activated carbon is mixed with the water for removing organics and micropollutants. The process entails directing the sludge to a sludge separator where the powder reagent or powder activated carbon can be removed or separated from the sludge and recycled back to the water being treated.

Other objects and advantages of the present invention will become apparent and obvious from a study of the following description and the accompanying drawings which are merely illustrative of such invention.

DESCRIPTION OF EXEMPLARY EMBODIMENTS

Figure 1:
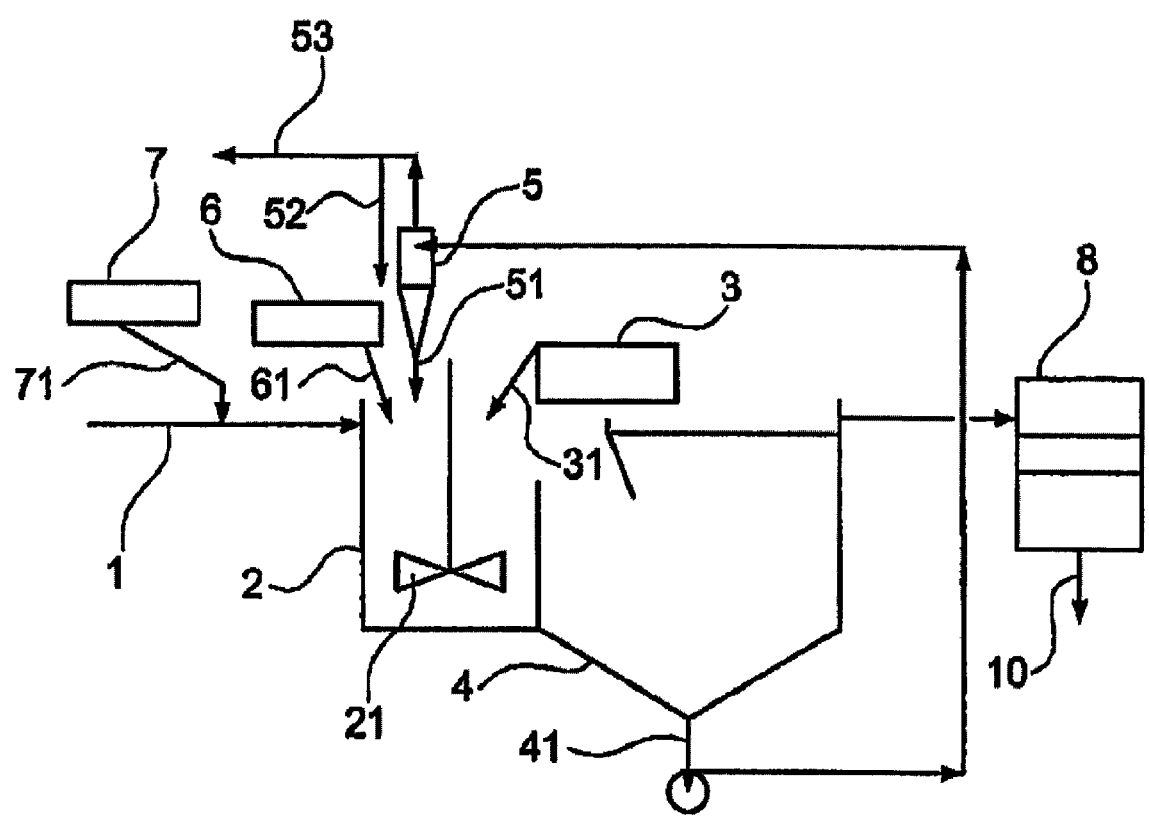
FIG. 1 is a schematic illustration of the water treatment process according to the present invention.

With reference to the drawings, and particularly FIG. 1, there is shown therein a first process for treating water. As illustrated therein, water to be treated is directed through an inlet line 1 into a contact tank 2. Contact 2 includes an agitator or stirrer 21. There is also provided an injector 3 for injecting a flocculent, indicated by arrow 31, into tank 2. Also there is provided an injector 6 for injecting an inorganic reagent powder with a high specific area, which is represented by arrow 61 in FIG. 1. The term "inorganic reagent powder with high specific area" means any powder reagent capable of reacting with one of the compounds present in the water, such as organics, micropollutants, and other contaminants, either by absorption or by ion-exchange, in order to decrease the content of the pollutants and contaminants in the water. While various types of reagent powders may be used, in one embodiment the inorganic reagent powder is powdered activated carbon (PAC). Examples of other inorganic powder reagents are powdered clay, powdered activated clay, ion-exchange resin, powdered alumina and activated alumina.

Tank 2 comprises a treatment zone or a treatment area. Downstream from tank 2 is a settling tank or clarifier 4. Although the mirror speeds can vary, it is believed that in a process that utilizes ballasted flocculation, that the settling tank 4 can achieve mirror speeds of between 25 m/h and 120 m/h. In some embodiments, the mirror speed is preferably around 50 m/h. Settling tank 4 could be provided with conventional separator plates or lamella.

Downstream from the settling tank 4 is a filtration stage 8 that includes a membrane filter that functions to refine the water and to remove additional contaminants such as flocs or fines which can be recycled to inlet line 1 or can be discharged to a waste site or to an area for further treatment. There are various types of filtering devices that can be employed in the filtration stage 8. For example, the filtration device 8 can include a sand filtration unit, an activated carbon chip filtration unit, pozzolan filtration, expanded clay filtration, garnet filtration, membrane microfiltration, membrane ultrafiltration, membrane nanofiltration, reverse osmosis, bi-layer filtration such as hard coal/sand, activated carbon chips/sand, and sand/$MnO_2$, or tri-layer filtration containing one of the bi-layer filtrations with a third layer including garnet or $MnO_2$.

Also forming a part of the water treatment facility depicted in FIG. 1 is a separator 5. Separator 5 may be of various known types, for example, a hydrocyclone. Note that separator 5 is connected to a sludge recycle line that extends from the bottom of the settling tank 4 to the separator 5. As will be appreciated from subsequent portions of this disclosure, sludge that settles to the bottom of settling tank 4 is directed through the recycle line to the separator 5.

Basically, reviewing the process of FIG. 1, water to be treated is directed through line 1 into tank 2. Prior to the water reaching tank 2, and injector 7 can inject a coagulant, represented by the arrow 71 in FIG. 1, into the water where the coagulant is mixed therewith. In some particular processes, a coagulant 71 is not required. Once the water reaches tank 2, which is a treatment zone, the inorganic reagent powder 61 as well as a flocculant (polymer) 31 is injected and mixed with the water. In one embodiment, the reagent powder is powdered activated carbon. The concentration of the powdered activated carbon can vary depending on the application and other factors. However, in one embodiment, the powdered activated carbon concentration in tank 2 is maintained generally between 5 and 150 $kg/m^3$ of water present in tank 2.

The water in tank 2 having the reagent powder and flocculant mixed therewith is directed into the settling tank 4. Sludge settles to the bottom of tank 4 and a clarified effluent is produced by the tank 4 and directed to the membrane filtration unit 8. The sludge that settles to the bottom of the settling tank will include the reagent powder, and in one embodiment, powder activated carbon. This sludge is directed out line 41 to separator 5. Separator 5 separates the reagent powder or powdered activated carbon from the sludge. A portion of the separated reagent powder or powdered activated carbon is represented by the line or arrow 52 in FIG. 1. This separated reagent powder or powdered activated carbon is recycled to the process, and in particular is directed to the tank 2 and mixed with the water being treated. Another portion of the reagent powder or powdered activated carbon is represented by the numeral 53 and can be wasted or directed to another site for further treatment. Thus, it is appreciated that economy is served by recycling a portion of the inorganic reagent powder or powdered activated carbon.

In some cases, the process shown in FIG. 1 includes a ballasted flocculation process that is used in conjunction with the inorganic powder reagent. In this case a ballast, such as an inorganic granular material such as microsand, is injected from a ballast source (not shown) into tank 2, and because of the presence of flocculant 31, the ballast or sand will form flocs of contaminated material. The flocs formed around the sand can include suspended solids along with particles of the powder reagent that may have absorbed organics from the water. These flocs form a part of the sludge that settles to the bottom of tank 4. Details of a ballasted flocculation process are not dealt with here because such processes are well known and appreciated by those skilled in the art. Ballasted flocculation can be used in any of the processes described herein and depicted in FIGS. 1-3. For a more complete and unified understanding of ballasted flocculation, one is referred to the disclosures found in U.S. Pat. Nos. 4,927,543 and 5,730,864, the disclosures of which are expressly incorporated herein by reference. Therefore, the sludge pumped to the separator 5 is separated into a number of components. In cases where ballasted flocculation is employed, the ballast or sand in the sludge is separated by the separator 5 and the separated ballast in FIG. 1 is represented by 51. This separated ballast is reintroduced into the process by the same being injected into tank 2. Also, the separator 5, which may comprise a hydrocyclone, will separate the reagent powder or powdered activated carbon from the sludge and the separated powder reagent, represented by the numeral 52, can be recycled and reinjected back into tank 2.

Figure 2:
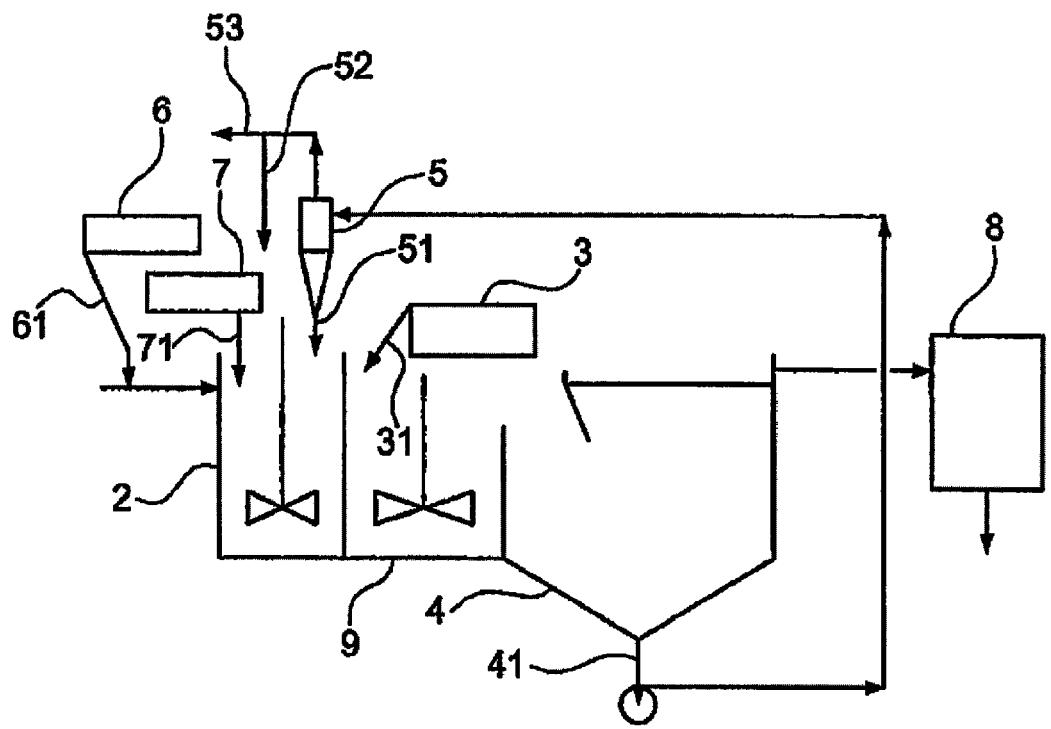
FIG. 2 is a schematic illustration of an alternate process.

The process shown in FIG. 2 is similar to FIG. 1 with the exception that the treatment zones include two tanks, tank 2 and tank 9. Tank 9 may be referred to as a flocculation tank inasmuch as the flocculant 31 is injected therein. In the process of FIG. 2, the reagent powder 61 is injected into the water stream prior to the water reaching tank 2 while the coagulant in this case is injected into tank 2. As with the process of FIG. 1, the process of FIG. 2 can also constitute a ballasted flocculation process where sand or an inorganic granular material is injected into tank 2 and mixed with the water. Thereafter, this mixture is transferred to the flocculation tank 9, which can be referred to as a maturation zone where the water, ballast and flocculant are mixed together. Ultimately, the water mixture reaching the settling tank 4 will produce a sludge and the sludge will be directed to the separator 5 where the separator will separate the reagent powder or powdered activated carbon 52 from the sludge and recycle the reagent powder or powdered activated carbon into the water. In cases where the process is also a ballasted flocculation process, the sludge will include a ballast 51 which will be separated by the separator 5 and injected into one of the treatment zones, which in the case of the FIG. 2 process, is injected into tank 2.

The retention time for the water in tanks 2 and 9 can vary, but in one embodiment the retention time in both tanks is preferably between 8 and 30 minutes.

Figure 3:
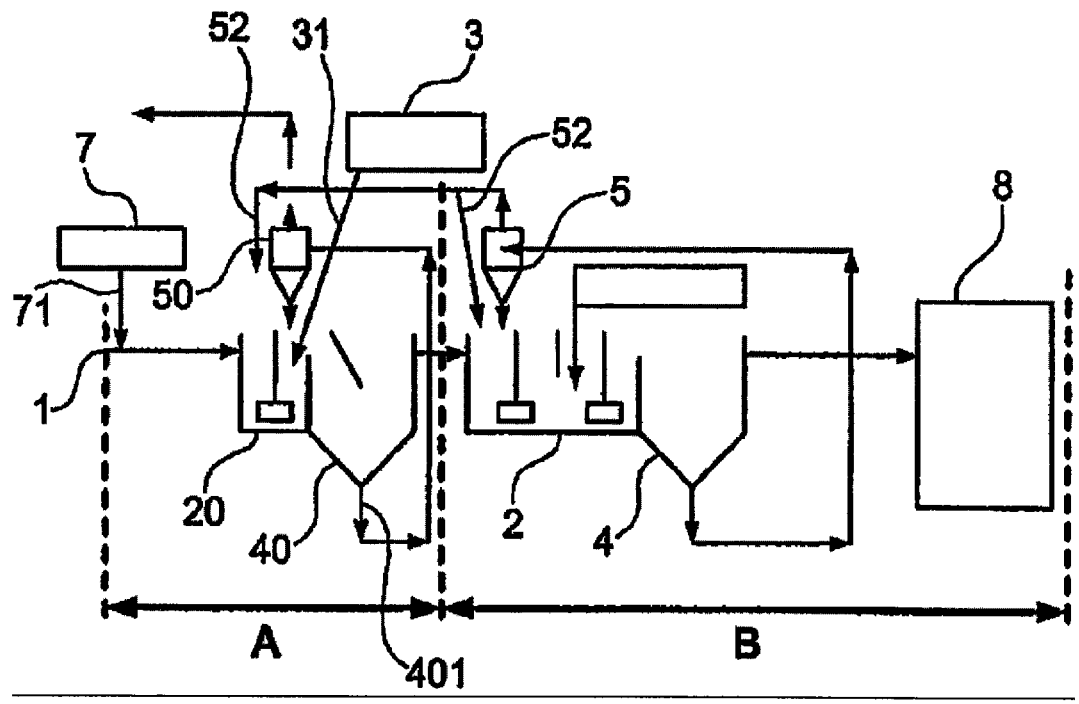
FIG. 3 is a schematic illustration of yet another alternate process for treating water.

Turning to FIG. 3, there is shown therein a water treatment process that is similar in some respects to the processes shown in FIGS. 1 and 2. The FIG. 3 process includes a preclarification process. That is, the water being treated is first subjected to a settling or clarification step, and thereafter the clarified water is subsequently treated with an inorganic reagent powder such as powdered activated carbon. The preclarification process can vary from a simple clarifier to a ballasted flocculation process which includes a setting tank or clarifier. Preclarification can be valuable or worthwhile in any number of situations. For example, when the turbidity of the water is greater than about 2 NTU then it is desirable in many instances to employ a preclarification step to remove suspended solids from the water being treated. In the FIG. 3 process, the preclarification process is depicted as zone A and zone B is a water treatment process similar to that described in FIGS. 1 and 2 where a powdered reagent such as powdered activated carbon is added to the water to remove contaminants of interest such as organics and micropollutants that occur in water. In any event, with respect to FIG. 3, the clarification zone includes a water inlet line 1, tank 20 and a settling tank 40. A coagulant 71 is injected into the water by injector 7. A flocculant 31 is injected into tank 20 by injector 3. Sludge that settles to the bottom of settling tank 40 is recycled to a separator 50 such as hydrocyclone separator. In the case of the example illustrated in FIG. 3, the preclarification zone can include a ballasted flocculation process. To carry out the ballasted flocculation process, an inorganic granular material, such as sand, is injected into tank 20 and mixed with the flocculent or polymer to cause flocs to form, and which are effective to remove suspended solids. Hence, the hydrocyclone separator 50 will separate the ballast or granular material from the sludge and reinject that ballast into the tank 20. The remainder of the sludge can be wasted or directed to another treatment site for further treatment. Clarified effluent from the preclarification zone A is directed to zone B and into tank 2 thereof. Various types of treatments can be employed. However, an inorganic reagent powder such as the type described above is mixed with the water for the purpose of removing or absorbing contaminants of interest such as organics and micropollutants. Again, as described earlier, the sludge that settles to the bottom of settling tank 4 will include the reagent powder. Once the sludge is returned to the separator 5, the reagent powder, such as powdered activated carbon 52, is separated from the sludge and reintroduced into tank 2. Also, as an option, some of the separated reagent powder 52 can be utilized in the preclarification zone A, and particularly can be directed into tank 20, and therefore would provide some treatment even before reaching zone B. As discussed above, the treatment process of zone B could include ballasted flocculation, and in that case, a ballast would be included in the sludge directed to separator 5 and the ballast would be separated from the sludge and reintroduced into tank 2 for treatment of the water.

The process of the present invention is useful in numerous applications. However, one particular application is in the treatment of water prior to the water being treated with a disinfectant such as chlorine. Disinfecting tap water is critical to protect the public from disease causing microorganisms. Chlorine is the most commonly used disinfectant. Drinking water is typically disinfected by using chlorine, for example, to kill bacteria, viruses and other organisms which can cause illness. However, disinfection byproducts formed when disinfectants such as chlorine are used to treat drinking water react with naturally occurring materials in the water, for example, decomposing plant materials. Disinfection byproducts are generally referred to as total trihalomethanes (TTHM—chloroform, bromoform, bromodichloromethane, and dibromochloromethane) and haloacetic acids (HAA5—monochloro-, dichloro-, trichloro-, monobrommo-, dibromo-) are widely occurring classes of DBPs formed during disinfection with chlorine and chloramines. The amount of trihalomethanes and haloacetic acids in drinking water can change from day to day, depending on the season, water temperature, amount of chlorine added, the amount of plant material in the water, and a variety of other factors. By treating the water, prior to chlorination, with an inorganic powder reagent such as powdered activated carbon, the precursors, organics and micropollutants, to these disinfection byproducts can be removed from the water.

It is postulated that the water treatment processes described above can be efficiently carried out, in some cases, by injecting the powder reagent and the polymer into the same tank, simultaneously or about the same time. All three processes disclosed in FIGS. 1-3 would provide means for injecting new or fresh powder reagent into the water.

Other water treatment processes can be employed in conjunction with the processes described with respect to FIGS. 1-3. For example, the complimentary processes of decontamination, ultraviolet processes, preoxidation, and interoxidation processes can be combined or used in conjunction with the processes described herein.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of treating water using a dual ballasted flocculation system, comprising:
   a. directing the water into a first ballasted flocculation system including a first treatment tank and a first clarifier disposed downstream from the first treatment tank;
   b. directing the water into the first treatment tank and injecting a flocculent and ballast into the first treatment tank to form flocs;
   c. directing the water containing flocs from the first treatment tank into the first clarifier, settling the flocs, and clarifying the water;
   d. directing the flocs from the first clarifier to a first separator and separating the ballast from the flocs and recirculating at least a portion of the ballast into the first treatment tank;
   e. after clarifying the water, directing the water from the first ballasted flocculation system to a second ballasted flocculation system including a second treatment tank and a second clarifier;
   f. in the second treatment tank adding powdered activated carbon and ballast to the water and forming flocs containing powdered activated carbon;
   g. directing the water and flocs containing powdered activated carbon from the second treatment tank into the second clarifier and settling the flocs containing powdered activated carbon;
   h. directing the flocs containing powdered activated carbon from the second clarifier to a second separator and separating the powdered activated carbon from the flocs and recirculating a first portion of the powdered activated carbon into the second treatment tank.

2. The method of claim 1 wherein settling the flocs containing powdered activated carbon includes forming a clarified effluent and the method includes directing the clarified effluent to a membrane filter disposed downstream from the second ballasted flocculation system and filtering the clarified effluent.

3. The method of claim 1 including mixing a coagulant with the water in the first ballasted flocculation zone.

4. The method of claim 1 further comprising directing a second portion of the powdered activated carbon into the first treatment tank.

5. The method of claim 4 wherein the water directed to the first clarifier includes a turbidity higher than 2 NTU.

6. The method of claim 4 wherein the water is also treated by ultraviolet treatment.

7. The method of claim 1 wherein a powdered activated carbon concentration in the second treatment tank is maintained between approximately 5 kg/m$^3$ and approximately 150 kg/m$^3$.

8. The method of claim 1 further comprising separating the ballast from the flocs in the second separator and recirculating at least a portion of the ballast in the second treatment tank.

9. The method of claim 1 further comprising:
   directing a second portion of the powdered activated carbon into the first treatment tank;
   separating the ballast from the flocs in the second separator and recirculating at least a portion of the ballast in the second treatment tank; and
   wherein a powdered activated carbon concentration in the second treatment tank is maintained between approximately 5 kg/m$^3$ and approximately 150 kg/m$^3$.

10. The method of claim 9 wherein settling the flocs containing powdered activated carbon includes forming a clarified effluent and the method includes directing the clarified effluent to a membrane filter disposed downstream from the second ballasted flocculation system and filtering the clarified effluent.

11. The method of claim 1 wherein after treating the water in the first and second ballasted flocculation systems the method further comprises treating the water with a disinfectant.

12. The method of claim 10 wherein the disinfectant is chlorine.

* * * * *